Feb. 1, 1938. W. D. FOSTER 2,106,730
ART OF MACHINE CONTROL
Original Filed Sept. 19, 1925 5 Sheets—Sheet 1
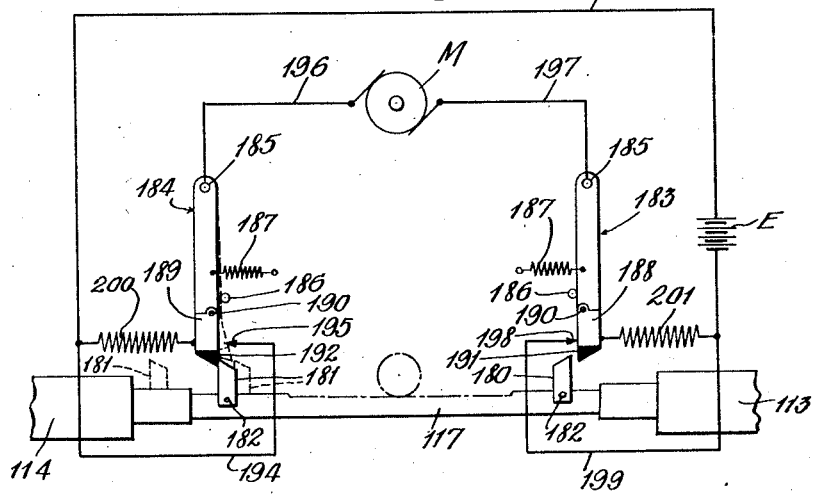
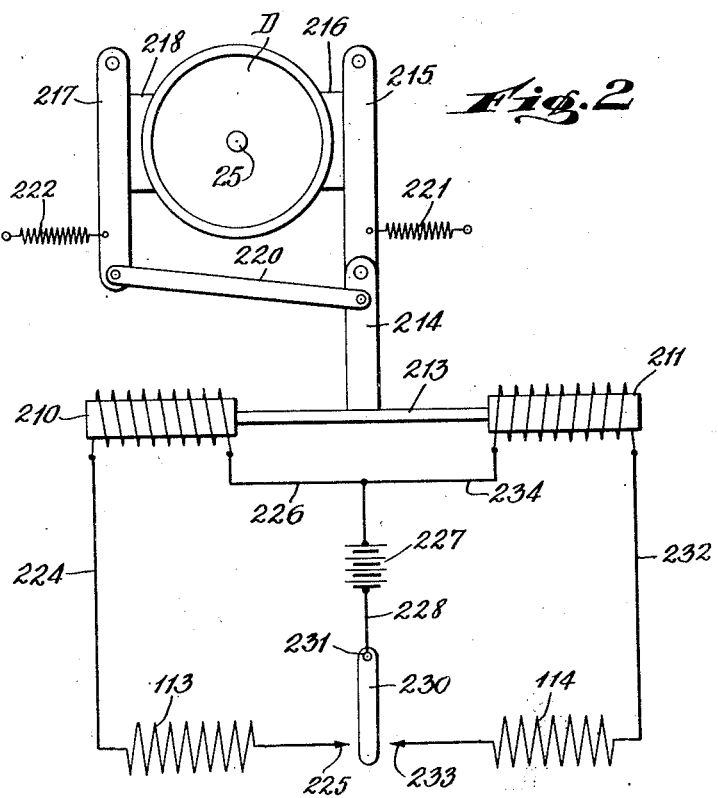
INVENTOR
WARREN DUNHAM FOSTER
BY Warren D. Foster
ATTORNEY Feb. 1, 1938. W. D. FOSTER 2,106,730
ART OF MACHINE CONTROL
Original Filed Sept. 19, 1925 5 Sheets-Sheet 2

INVENTOR
WARREN DUNHAM FOSTER
BY Warren D. Foster
ATTORNEY

Feb. 1, 1938.     W. D. FOSTER     2,106,730
ART OF MACHINE CONTROL
Original Filed Sept. 19, 1925     5 Sheets-Sheet 3
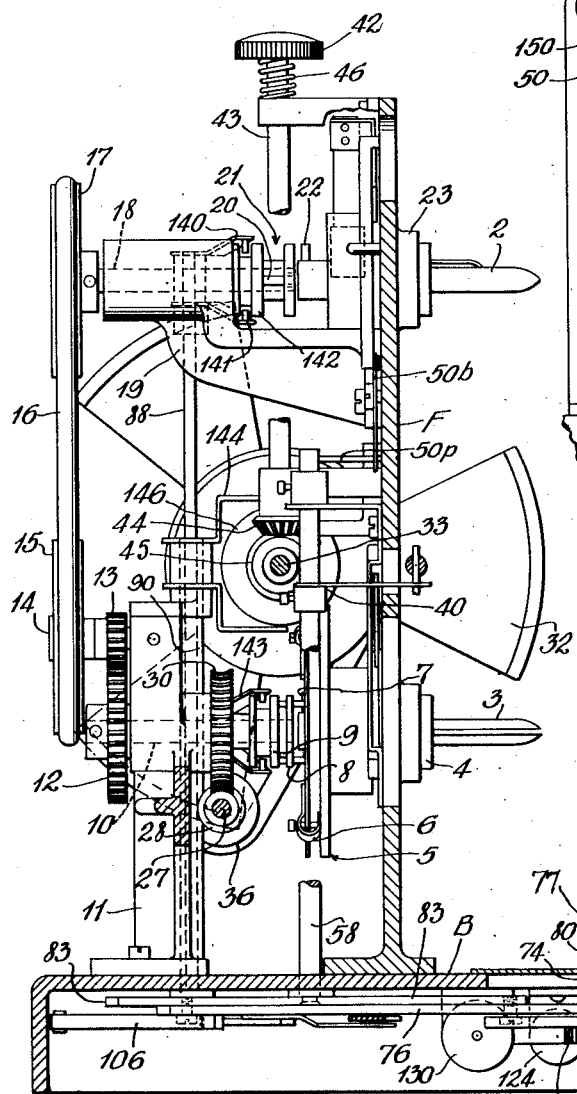
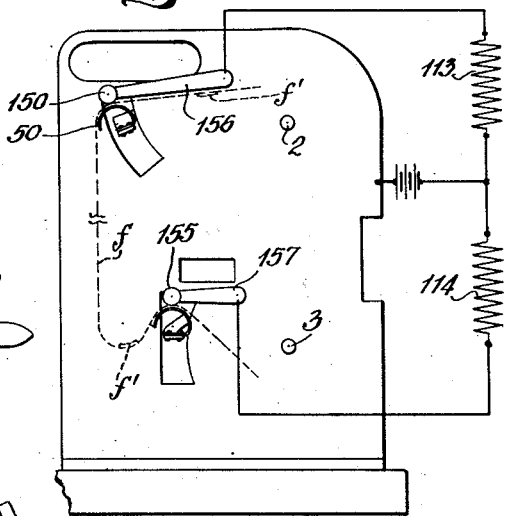
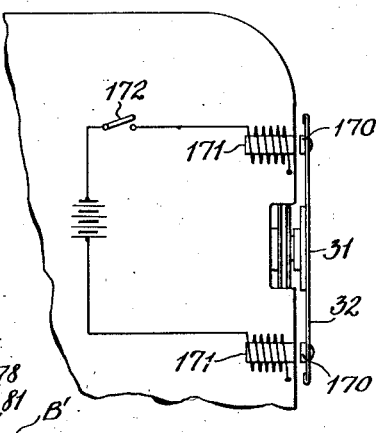
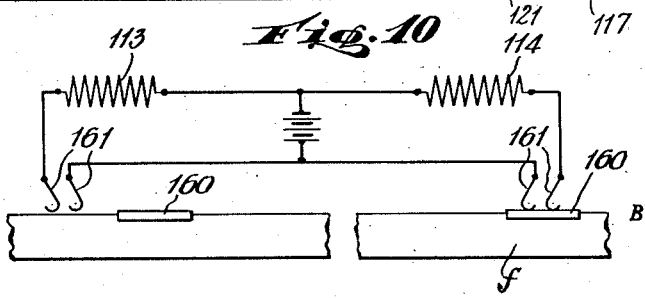
INVENTOR.
WARREN DUNHAM FOSTER
BY Warren D. Foster
ATTORNEY Feb. 1, 1938.    W. D. FOSTER    2,106,730
ART OF MACHINE CONTROL
Original Filed Sept. 19, 1925    5 Sheets-Sheet 4

INVENTOR
WARREN DUNHAM FOSTER
BY
Warren D. Foster
ATTORNEY

Feb. 1, 1938.   W. D. FOSTER   2,106,730
ART OF MACHINE CONTROL
Original Filed Sept. 19, 1925   5 Sheets-Sheet 5
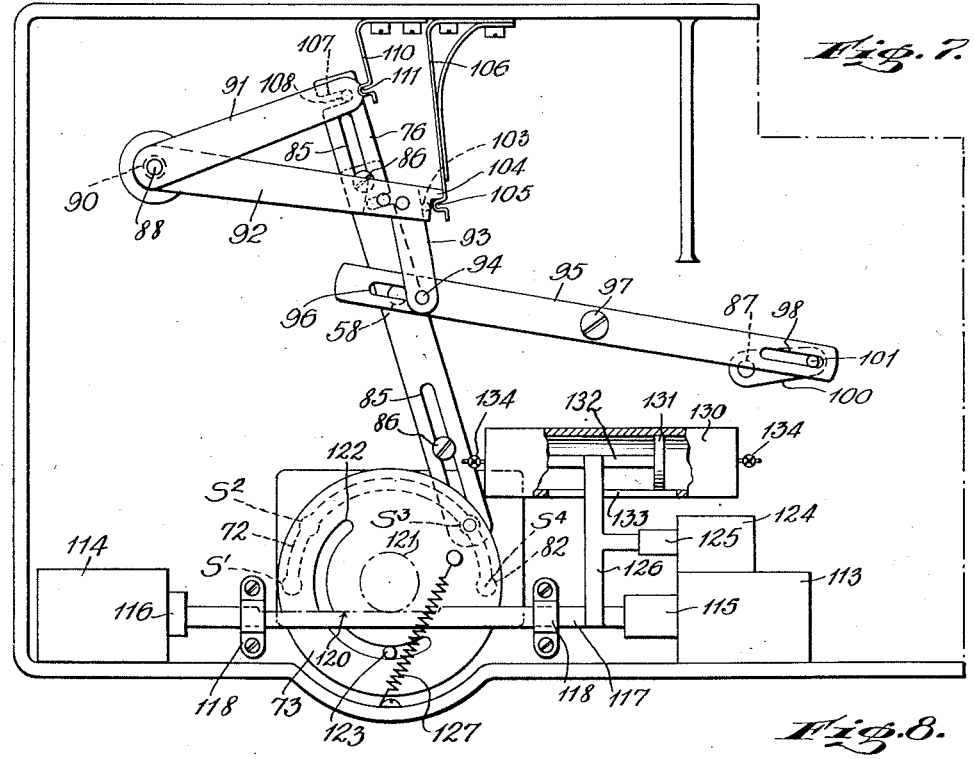
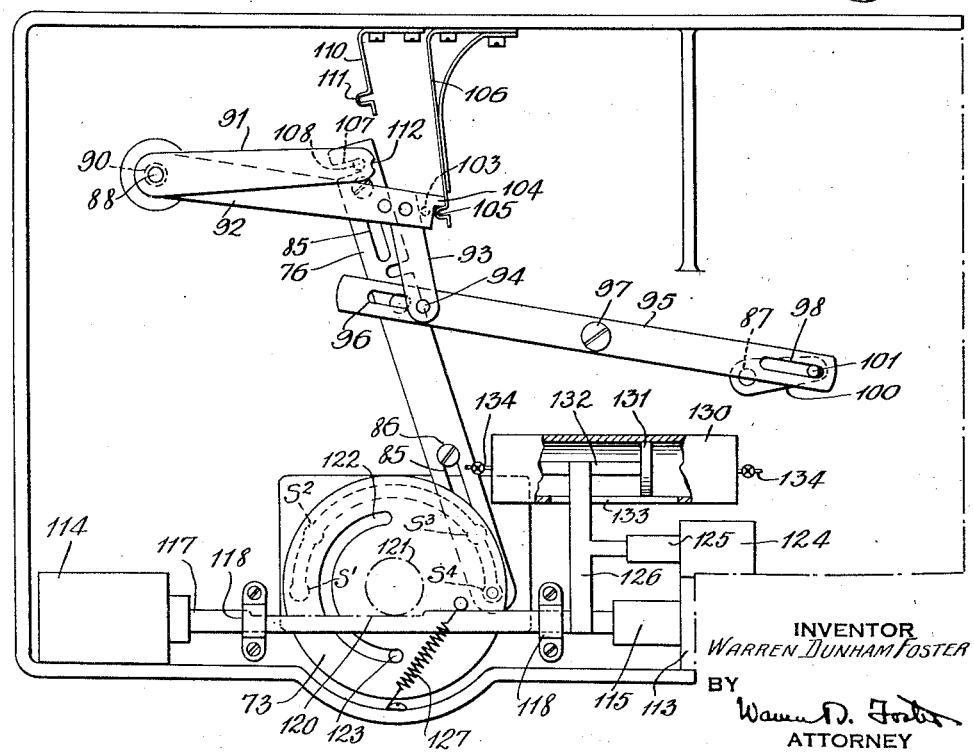
INVENTOR
WARREN DUNHAM FOSTER
BY
Warren D. Foster
ATTORNEY Patented Feb. 1, 1938

2,106,730

UNITED STATES PATENT OFFICE 2,106,730

ART OF MACHINE CONTROL

Warren Dunham Foster, Washington Township, Bergen County, N. J., assignor to Kinatome Patents Corporation, New York, N. Y., a corporation of New York Original application September 19, 1925, Serial No. 57,392, now Patent No. 1,943,303. Divided and this application November 7, 1933, Serial No. 697,089. In Great Britain September 19, 1925. Renewed March 21, 1936

59 Claims. (Cl. 88—17)

The present invention relates generally to the art of controlling power driven machines, and more particularly to means and methods for controlling power driven machines having operative parts the work conditions of which are required to be changed while the machines are operatively connected to the power which drives them.

An object of the present invention is to provide improved means and methods for controlling changes in work conditions of a power driven machine.

When power driven machines are automatically controlled, as is often desirable in modern industry, the changes of the work conditions of certain parts such as, for example, connecting and disconnecting the parts to and from the source of power, is usually done quickly and often very quickly. The objectionable effects resulting from severe stresses being suddenly imposed upon an operating machine or machine part have long been known. In recent years, it has been learned that very undesirable effects often result from relatively small stresses being suddenly and repeatedly imposed upon a machine or parts thereof. The strains resulting from such stresses are often in effect cumulative to some extent and sometimes cause ruptures of the parts and unexpected breakdowns of the machines when apparently the causative stresses are not excessive.

Another object of the present invention is to provide improved control means and methods for a power driven machine which is effective for preventing or relieving sudden strains on the machine resulting from quick changes of work conditions of the parts of the machine while it is being operatively driven.

Many modern power driven machines are constructed to operate at high speed on delicate and fragile work pieces such as, for example, motion picture films and thin paper such as is usually wrapped around cigarettes. A change of work condition in a machine which brings even a slightly excessive strain upon a delicate work piece is objectionable for obvious reasons. Another object of the present invention is to provide control means for a machine operating on a delicate work piece which control means may be actuated by the work piece to be effective for reducing strains on the work piece which result from changes of work conditions in the machine or parts thereof engaging the work piece.

Many machines used in modern industry are each directly connected to an electric motor. Should such a machine and its direct connected motor be brought to a full stop each time the work condition of a part was required to be changed, the part and the machine would perhaps be saved from considerable strain, but much time would be lost in the course of a day's operation of the machine. Furthermore, while strains on the machine were decreased by such a method of operation, the motor would be subjected to a considerable extra strain each time it had to start from a dead stop against a full load on the machine. It is a further object of the present invention to provide method and means for expeditiously changing the work conditions of parts of a direct connected motor driven machine without subjecting the parts or the motor to materially increased strains.

It is often desired in the operation of motor driven machines to bring a certain movable part or parts of the machine to a complete stop in predetermined relation to other parts of the machine or to a work piece in the machine without stopping the operation of the machine as a whole. Another object of the present invention is to provide control means for a machine which is operative to stop a desired moving part of the machine in a predetermined position along its work path without stopping the operation of the remaining parts of the machine.

It may be desired to disconnect one part or group of parts of a machine from other parts or groups of parts and then to stop each part or group separately from that disconnected therefrom. One part may be relatively delicate, for example, and other parts may support a heavy mass of work material and hence be subject to high momentum. If the delicate part is disconnected from the part of high momentum before the delicate part is stopped in a predetermined position, the delicate part will be relieved of much strain. An object of my invention is to supply such mechanism.

It is often desirable while a power driven machine is operating on a work piece to stop such work piece in a predetermined relation to some element of the machine. A further object of my invention is to provide improved means for stopping a work piece which is being operatively moved in a machine in a desired work position.

A feature of the present invention resides in the provision of a compactly arranged control mechanism suited to be disposed in a relatively flat hollow base of a machine such as are commonly used for supporting many machines. Another feature of the invention resides in the provision of an improved solenoid device having means for disposing the control mechanism of the invention in numerous predetermined control positions.

Another object of my invention is to provide improved control mechanism which is actuated by the work piece.

Other features and advantages of the invention will appear hereinafter as the description proceeds or will be apparent from the claims. It will of course be understood that the means shown in the drawings for practicing my invention are purely for purposes of illustration and that changes may be made therein without departing from the scope of my invention or of the broader claims.

I am illustrating my invention as applied to a film handling apparatus, but it will be understood that it applies broadly to any machine having the needs or characteristics hereinbefore stated, and may well be included as an element of the control mechanism in many machines of widely varying types and uses.

The present invention is a division from my co-pending application, Serial Number 57,392, filed September 19, 1925, now Patent Number 1,943,303. Portions of the present disclosure appear in my co-pending application Serial Number 596,884, filed March 4, 1932, now Patent Number 1,944,026, which is also a division from my aforesaid parent application.

In the drawings which form a part of the specification:

Figure 1 is a diagrammatic view illustrating one embodiment of my invention for controlling a motor by means which are interconnected with means for controlling a machine driven by the same motor.

Figure 2 is a diagrammatic view illustrating another way my invention may be carried out for controlling a source of power by means which are interconnected with means for controlling a machine driven by the same source of power.

Figure 4 is a rear elevational view, broken away in part, of the structure shown in Figure 3.

Figure 3:
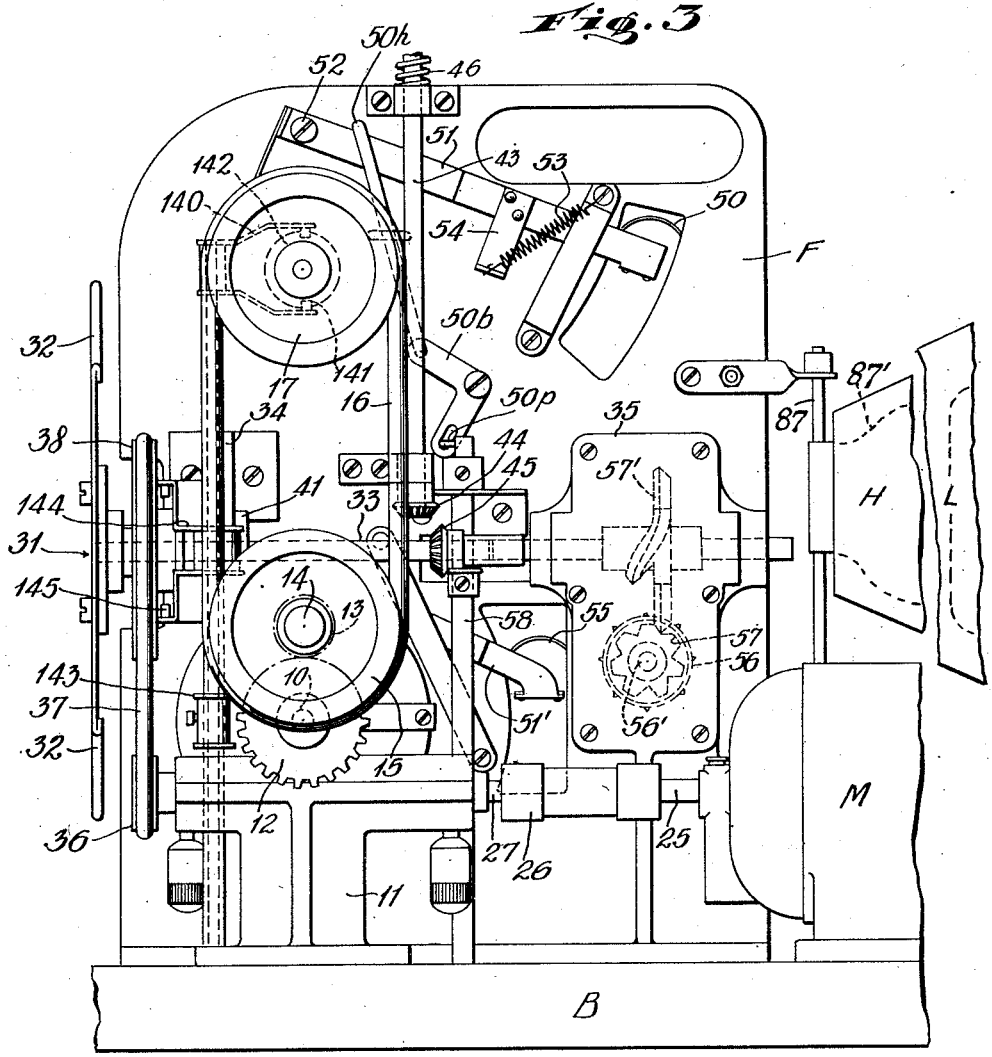
Figure 3 is a partial side view illustrating a machine operatively connected to an electric motor, the machine and the motor both being controlled by the control means of the present invention.
Figure 5:
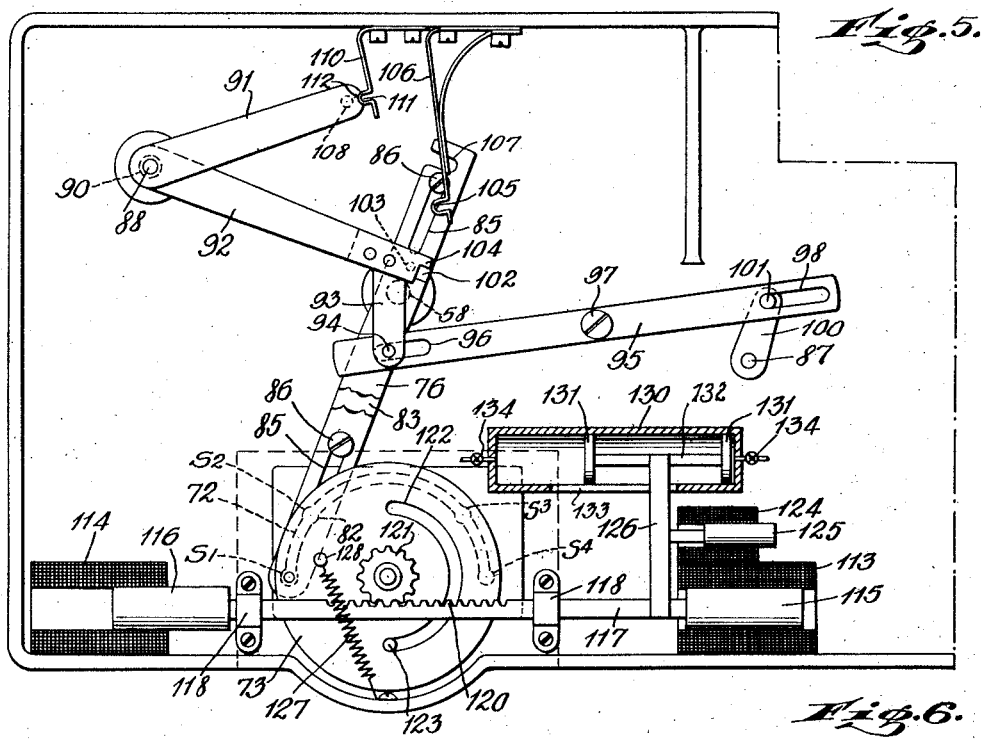
Figure 5 is a bottom view looking up, broken away in part, of a control mechanism of the machine of Figure 3 which may be employed in carrying out my invention.
Figure 6:
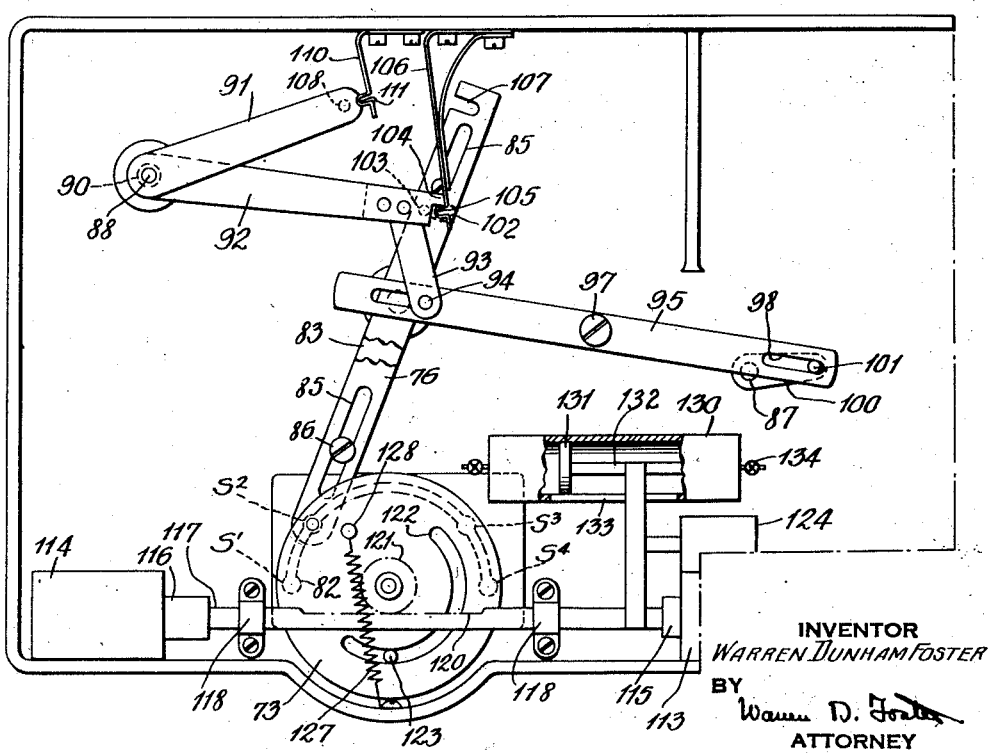

Figures 6, 7, and 8 are operational views of the control mechanism of Figure 5 and which illustrate different operative control positions in which the members of the control mechanism of Figure 5 may be disposed when an actuating control member thereof is disposed at three different control stations respectively for controlling the machine of Figure 3.

Figure 9 is a wiring diagram illustrating how a work piece in the machine shown in Figures 3 and 4 may actuate the control mechanism of Figure 5.

Figure 10 is a wiring diagram similar to Figure 9 and illustrates how the side edge portion of a work piece may be employed for actuating the control mechanism of Figure 5.

Figure 11 is a diagrammatic view illustrating how a movable part of the machine shown in Figures 3 and 4 can be stopped in a predetermined work position.

Figure 12:
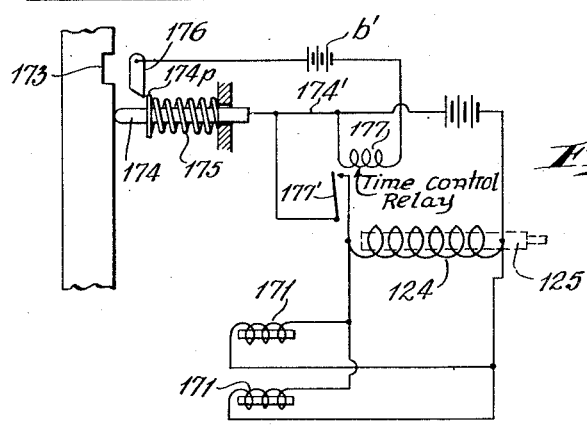

Figure 12 is similar to Figure 11, and shows an automatic interconnection between the means for disconnecting certain parts from the driving mechanism and the means for positioning such parts predeterminedly.

The control means of the present invention, for illustrative purposes, are shown as applied to a motion picture apparatus such as is disclosed in my parent application, and to an electric motor for driving this apparatus. It does not appear essential for an understanding of the present invention to repeat all of the detailed description of the above noted motion picture apparatus which appears in the parent application. Enough of the apparatus is shown and described, however, in the present application to illustrate the corelation of the electric motor, certain operable parts of the apparatus, the work conditions of which are changed, and the control means of the present invention which change the work conditions of these operable parts.

As shown in Figures 3 and 4, the apparatus may include a hollow metal supporting base B which carries an upright supporting frame F upon which base and frame are mounted the operating parts of the film feeding and controlling mechanism per se. One of such parts is a source of light indicated by portions of a lamp L and a lamp housing H. Preferably carried by the frame F and projecting laterally from one side thereof in spaced relationship, is a pair of reel-receiving spindles 2 and 3. The upper spindle 2, which will hereinafter be designated the rewinding spindle or delivery spindle, is adapted for holding a reel of film during the feeding movement thereof and adapted to effect the rewinding of the film at the conclusion of the feeding movement, while the lower spindle 3, hereinafter designated the take-up spindle, is adapted to be driven simultaneously with the feeding movement for coiling or taking up the film as required.

The film may be carried in a storage and exhibiting container (not shown) of any suitable kind or upon a conventional open reel. The lower spindle 3 is journaled for rotation in a suitable bearing 4 in the frame F. The inner end of the spindle 3 preferably carries one element of a slip clutch device generally designated as 5, the construction of which may be as desired or as described in the parent application. The slip clutch device includes driving members 6 to which are secured a driven element 7 of a releasable clutch generally designated as 8 which may be constructed as disclosed in the parent application or be of any other suitable construction. The driving element 9 of the clutch 8 may be mounted in a well known way for splined movement along a shaft 10 which may be journaled in a bracket 11 supported on the base B. Means for rotating the shaft 10 and the spindle 3 will be described hereinafter.

For operatively connecting the shaft 10 with the spindle 2 so that both spindles may be driven from the same source of power, a gear 12 may be fastened on the rear end of the shaft 10 and engage a gear 13 mounted on a rearwardly extending stub shaft 14 journaled in the bracket member 11. Disposed outwardly from the gear 13 a pulley 15 is mounted on the shaft 14 and is connected by a belt 16 to a pulley 17 mounted on a shaft 18 journaled in a bracket 19 mounted on the frame F. On the forward end of the shaft 18 there are mounted for splined movement therealong driving elements 20 of a releasable clutch device generally designated as 21 which may be of the same construction as the clutch 8. A clutch element 22 for coaction with the clutch elements 20 is mounted on an enlarged rear extension of the spindle 2 which may be journaled in a bearing 23 mounted on the frame F.

For driving the motion picture apparatus disclosed in Figures 3 and 4, a motor M may be mounted on the base B (see Figure 3) and have its armature shaft 25 connected as by a suitable flexible coupling 26 to a shaft 27 journaled in the bracket 11. Fastened on the shaft 27 is a worm 28 (Figure 4) arranged for driving a worm wheel 30 fastened on the shaft 10.

For cooperation with film feeding means hereinafter described, a shutter 31 having angularly spaced blades 32 may be mounted on a shaft 33 one end of which is journaled in a bracket 34 fastened to the side of the frame F and the other end of which is journaled in a housing 35 which may be constructed as described in the parent application. For driving the shutter 31 a pulley 36 may be fastened on the forward end of the shaft 27 and be connected by a belt 37 to a pulley 38 loosely mounted on the shaft 33. Fastened to a hub of the pulley 38 is a driven element 40 of a clutch. The clutch element 40 is arranged for engaging with a cooperative clutch element 41 splined to the shaft 33. When desired, the shutter blades 32 may be manually positioned by means of a thumb piece 42 fastened on the upper end of a shaft 43 which carries at its lower end a beveled gear 44 arranged for meshing with a beveled gear 45 fastened to the shaft 33. The beveled gear 44 will normally be held out of arrangement with the beveled gear 45 by a spring 46 under the thumb piece 42.

For operatively feeding the film through the motion picture apparatus of Figures 3 and 4 there may be provided feeding means such as are fully described in the parent application, and which may include an upper resiliently mounted film guide 50 mounted on an arm 51 pivoted on a screw 52 on the frame F and urged upwardly by a spring 53 one end of which is fastened to a bracket 54 on the arm 51 and the other end to a screw in the frame F. A film guiding member 55 similar to the member 50 may be mounted adjacent the take-up spindle on a resiliently mounted arm 51'.

Means are provided for manipulating the guides 50 and 55 for providing a shorter and more direct work path between the film carriers (not shown) which are mounted on the spindles 2 and 3. A link member 50h has a portion engaging over the arm 51 adjacent its pivot 52, and this link extends downwardly to a connection with one arm of a bell crank 50b. The other arm of the bell crank is slotted to engage a laterally projecting pin 50p in the upper end of a downwardly extending shaft 58 which is moved angularly by means hereinafter described so as to swing the lever 51 and the film guide downwardly and thereby shorten and straighten the film path for such purposes as rewinding when the film is usually moved faster than when it is fed for projection purposes. An operative connection between the lower arm 51' and the shaft 58 may be provided which is similar in construction to that described above for connecting the arm 51 to the shaft 58, or a connection such as is disclosed in my parent case may be provided. Means for moving the shaft 58 angularly appears hereinafter.

Between the resiliently mounted members 50 and 55 there may be provided an intermittent sprocket 56 of the kind described in my parent application which may be mounted on a shaft 56' having fastened thereto a star wheel 57 of usual design which may be driven by a cam member 57' mounted on an extension of the shutter shaft 33. The construction of the star wheel 57 and cam 57' may be the same as shown in my parent application. By this construction, the shutter 31 and the intermittent sprocket 56 are operatively connected so that when the shuter 31 is stopped the sprocket 56 and the film f are also stopped. As the film is fed through the apparatus, it is drawn from a coil around the delivery spindle 2 and passes therefrom to the resilient member 50, thence to the intermittent sprocket 56 and past the resilient film guide 55 to the coil around the take-up spindle 3.

It will be understood as the description proceeds that the control portion of the structure of the present invention may be mounted in various ways on the machine or apparatus it is to control. In the present disclosure, my control mechanism is shown mounted in the hollow base B on which may be supported the apparatus to be controlled by the mechanism of my invention. It will be understood that the base B may be of any suitable shape and depth and will support such frame members F and 11 as may be required in connecting my mechanism to the apparatus.

The control mechanism of the present invention is well suited for manual operation alone or for automatic operation by apparatus with which it is associated, or for manual operation in part and automatic operation in part. To make more facile this dual operation of my control mechanism, the parts in base B may be connected by means hereinafter described with a single control knob or finger piece or button 71 designed to be grasped and manually moved along an arcuate slot 72 in the base B between a plurality of operating stations.

In the immediately following portion of this specification, I describe my control mechanism as operated manually. Later I describe electrical and automatic operation thereof.

For convenience I designate these stations in this application as in my parent application, S1, S2, S3, and S4. It will be understood as the description proceeds that a smaller or greater number of operating stations may be employed.

As shown in Figures 4 to 8, one form of my control mechanism may include a disc 73 which may have a pivotal or rotative support 74 on the top of the base B or on a plate B' which may be secured to the base over an opening therein (Figure 4). The disc 73 will be coaxial with the slot 72. This disc has secured thereto a stub pin 75 (Figure 4) which is mounted in one end of a lever 76 to be further described. The finger piece 71 has a head portion 77 provided with an inwardly projecting pin 78 arranged to engage in a bayonet type slot 80 cut in the pin 75. By reason of this construction, it will be apparent that by a rotative movement of the finger piece 71 the latter may be moved vertically on pin 75, and may either occupy thereon an upper or lower operating position. At its lower end, the finger piece 71 has a collar 81 of a diameter to fit snugly in an enlarged circular portion 82 (Figure 5) of the slot 72 provided at each of the operating stations S1, S2, S3, and S4. With the finger piece 71 in its lower position, accidental movement from one of these stations is prevented, while with the finger piece in its upper position on pin 75 the mechanism to which the finger piece is connected is free for manual operation, or automatic operation independently of any operator, as will be presently explained.

The lever 76 may be slidably mounted against the lower face of another lever 83 which is rigidly fastened on the lower end of the vertical, rotatably mounted rock shaft 58 which may extend upwardly through the base B to be suitably connected with machine parts to be controlled such as the film guides 50 and 55. Adjacent each end of the lever 76, a lengthwise slot 85 is provided therein and through each of these slots there projects a headed pin or shoulder screw 86. It will be noted that while the lever 83 is secured to the rock shaft 58 and is thus limited to angular movement, the lever 76 is mounted for movement angularly and longitudinally, which advantageous construction greatly increases the compactness and flexibility of my control mechanism and when employed in cooperation with other features of my invention, greatly increases the possible number and character of operative control connections which can be made between my control mechanism and various parts of the apparatus to be controlled. Also, this arrangement of the levers 76 and 83 facilitates the movements in desirable timed relation of certain parts of the apparatus to which they are connectible.

For operatively connecting and disconnecting various parts of a control apparatus to and from a source of power, or moving such parts or otherwise affecting them for control purposes, I find it preferable, in many cases, operatively to connect my control mechanism to the controlled apparatus through a plurality of rock shafts and sleeves coaxial therewith which shafts and sleeves extend upwardly through the top of base B. If desired, my control mechanism can be mounted on the top or side of a housing (not shown) which may enclose the apparatus to be controlled and the rock shafts and sleeves can extend downwardly or laterally into the housing in convenient position relative to the parts to be controlled. As can be readily seen by those skilled in power transmitting mechanism, other machine elements can be used with the above described control shafts and sleeves or can replace them entirely.

In Figures 5 to 8, two such rock shafts 87 and 88 are illustrated in addition to the rock shaft 58. A sleeve or tube 90 surrounds the rock shaft 88. For predeterminedly rocking the shafts 87 and 88 and the sleeve 90 by movement of the disc 73 an arm 91 is fastened rigidly on the lower end portion of the shaft 88 and the rock arm 92 is rigidly fastened to the sleeve 90. To the outer end of the rock arm 92 may be fastened, as by riveting, an angular extension 93 in the outer end of which is fastened a stub pin 94.

A lever 95 having a longitudinal elongated slot 96 is pivoted on a shoulder screw 97 so that the slot may engage the pin 94. For operatively connecting the other end (the right hand end as viewed in Figure 5) of the lever 95 with the rock shaft 87, a lengthwise slot 98 is provided in the end of the lever 95 and a rock arm 100 is fastened rigidly on the lower end of the shaft 87 and is provided with a stub pin 101 arranged for engaging with a loose fit in the slot 98.

I prefer operatively to connect the sliding lever 76 with the rock arm 92 by the following means. A crosswise slot 102 is provided in the lever 76 adjacent the upper lengthwise slot 85 as viewed in Figure 5. An upwardly extending pin 103 is fastened securely in the rock arm 92 for engagement in slot 102 in the lever 76 which slot it will be noted has its open end extending to the right edge of the lever 76. There is also provided on the rock arm 92 a latching finger 104. The cooperation of the pin 103 and the slot 102 is as follows: when the finger piece 71 is moved from station S1 to station S2 or from the position shown in Figure 5 to that shown in Figure 6, the extension 93 and the arm 92 will be moved upwardly as viewed in such Figure 5 until the finger 104 engages with the latching detent element 105 integrally formed in a spring 106 which may be fastened in a well known way on the base B. Immediately after the engagement of the finger 104 and the detent element 105 which takes place upon the arrival of the finger piece 71 at the station S2, further movement of the finger piece 71 toward station S3 will begin moving the slot 102 out of engagement with the pin 103 as will be understood by inspection of Figure 7. It will be noted that the movement of the arm 92 to position wherein it is locked by the detent 105 will have rocked the sleeve 90 counter-clockwise through a considerable angle.

To rock the arm 91 and the shaft 88 for control purposes the finger piece 71 may be moved from station S2 toward station S3 whereupon the upper end of the lever 76 as viewed in Figure 7 is swung to the left and is also moved toward the upper end of the base B. By the time the finger piece 71 has reached station S3 an open leftwardly extending slot 107 provided in the outer end of the lever 76 will have been moved into position for engaging an upwardly extending pin 108 which is fastened securely in the outer end of the rock arm 91. The rock arm 91 is normally held in a work position for engagement of the pin 108 by the slot 107 by means of a spring 110 which may be fastened in a usual way on the base B and be formed with a detent element 111; a notch 112 being formed in the end of the arm 91 for engagement with the detent element 110.

Movement of the finger piece 71 from station S3 to station S4 will move the rock arm 91 and the rock shaft 88 clockwise as will be seen by inspection of Figure 8. In many cases, apparatus which is controlled by the mechanism of my invention will be disposed in a work condition by the movement of the finger piece 71 from station S1 around to station S4 wherein it will be desirable to have the apparatus operate for a time with its parts disposed in such positions as will result from moving the finger piece 71 from station S3 to station S4 and wherein certain parts connected with the sleeve 90 and the rock shaft 88 are to be affected by this last portion of the control movement of the finger piece 71.

Movement of the finger piece 71 from station S4 back to station S1 which ordinarily will dispose the controlled apparatus in normal operating condition is effective to move the rock shafts 58, 87, and 88 and the sleeve 90 in the following sequence: Upon movement from S4 to S3 the arm 91 is moved back to its normal or Figure 7 position and is latched therein. This movement of the lever 76 is without effect on the rock arm 92 and the lever 95. Further travel of the finger piece 71 from station S3 toward station S2 is effective to disengage the lever 76 from the rock arm 91 and leaves the rock arm 92 and the lever 95 motionless for a time, but swings the rock shaft 58 clockwise, as viewed in Figure 7, which shaft was not perceptibly moved by the travel from S4 to S3. During the latter part of the travel of the lever 76 from its S3 position to its S2 position it begins to reengage the notch 102 with the pin 103, and when the finger piece 71 has arrived at the station S2 the lever 76 is securely connected to the rock arm 92 by means of the notch 102 and the pin 103. During the final travel of the finger piece 71 from station S2 to station S1 the arm 92 is pulled free of the detent spring 106 and is swung clockwise together with the sleeve 90. This movement of the rock arm 92 swings the extension 93 and the lever 95 with it, and the arm 100 and the rock shaft 87 are returned by counter-clockwise movement of the lever 95 to the Figure 5 position. This leaves the parts of the apparatus in the same position they were in when the operation of the control mechanism began.

It will be noted that by the provision of the elongated slots 96 and 98 for engagement with the pins 94 and 101 respectively that the movement of the rock shaft 87 may be controlled so that it lags behind the other moving parts. In other words, the rock shaft 87 may begin to move a predetermined time after the initial operation of the control mechanism or at once, and it may be returned to normal operative position after all the other moving parts controlled by the control mechanism have been returned to their normal position. This feature of my control mechanism will be found very desirable in connection with the control of certain kinds of apparatus.

In order that my control mechanism may be operated automatically by the apparatus or machine which it controls I provide means for moving the disc 73 predeterminedly, and independently of an operator. One form of such means may include two oppositely acting solenoids 113 and 114. These solenoids will preferably be placed one on each side of the disc 73 and the core elements 115 and 116 of the solenoids may be formed integrally with each other and the core-connecting bar section or element 117, thus providing a common core for both windings, or the bar element 117 may be constructed of different material.

One advantage of my construction results from the disposition of magnetizable metal, ready to be acted upon by that part of the field of the solenoids which extends considerably inwardly therefrom beyond the ends of the windings. Thus by making the core elements 115 and 116 of the same piece of metal and by disposing some of such metal beyond the ends of the windings and within the extension of the magnetic field much of which is ordinarily wasted, I secure a greater pulling force from a given amount of space and metal than would be the case if the cores were joined by a piece of non-magnetic material.

For guiding the element 117, two guide members 118 may be fastened to the base B in any suitable way. For operatively connecting the element 117 with the disc 73 a rack may be provided on the element 117 by having rack teeth 120 cut therein, or if preferred, the teeth 120 may be cut in a separate piece of harder metal which may be fastened on the bar element 117. To cooperate with the teeth 120 the pinion 121 may be rotatably mounted on the support 74 coaxial with the disc 73 and connected therewith.

To connect the disc 73 with the lever 76 the pin 75 in the lever extends downwardly through an oversize hole in the disc 73. Before the initiation of operation of the control mechanism by solenoids 113 and 114, the finger piece 71 will be disposed in its upper position and held therein by the means described above. When the core element 115 is sucked into the solenoid 113 as shown in Figure 5, it will be effective through the rack teeth 120 and the pinion 121 to move the disk 73 and the lever 76 to the Figure 5 position.

To insure that the disc is stopped accurately in the Figure 5 position, a circumferential slot 122 is provided in the disc 73 and a pin 123 is fastened in the base B to engage in the slot 122. Each end of the slot is rounded, and one end is positioned so that it comes up against the pin 123 when the pin 75 is at the S1 station. When the solenoid 114 is energized it sucks, i. e., pulls, its core element to the left and the rack teeth move the pinion 121 and the disc 73 clockwise until the other end of the slot 122 is stopped against the pin 123 (see Figure 8). It will be noted that the operative movement of the core elements of the solenoids 113 and 114 move the disc 73 and lever 76 all the way between station S1 and station S4, and between station S4 and station S1 respectively.

It is a feature of the present invention to provide simple positive means for moving the lever 76 to and stopping it in any desired one of the intermediate stations S2 and S3. In accordance with this feature, an auxiliary solenoid 124 is provided and may be mounted over the solenoid 113 as viewed in Figure 5 and have a core 125 connected to an arm member 126 connected to the bar element 117. As illustrated in the drawings, the windings of the solenoid 124 and the length of the core 125 are so arranged that when the solenoid 124 is energized the disc 73 will be revolved sufficiently to bring the pin 75 and the lever 76 to the S2 position as shown in Figure 6. It can be seen by inspection of Figures 7 and 8 that when the pin 75 and lever 76 are disposed at stations S1, S4 or station S3 the energization of the solenoid 124 will be effective to move the lever 76 to the S2 position as illustrated in Figure 6. In cases where it is desired to stop the lever 76 at other intermediate points between station S1 and station S4, an additional auxiliary solenoid or a plurality of additional solenoids arranged on each side of the disc 73 similarly to the solenoid 124 and connected in a suitable way to the rack bar 117 may be provided.

It is contemplated that in most cases the apparatus controlled by my invention will have its parts disposed in an operative position by a movement of the lever 76 to the S1 station or position. Ordinarily the parts of the apparatus will be held in such operating positions for a considerable period of time. With certain kinds of apparatus it is often desirable to run some of the parts backwardly for a suitable period of time as when rewinding work pieces or strips. When my control mechanism is used with the last named kind of apparatus it is considered desirable to have the parts to be controlled so connected to my mechanism that when the lever 76 is in the S4 position such parts will be operatively connected with a suitable source of power to be reversely operated. For making my mechanism more positive in controlling apparatus for this contemplated use, it is desirable to provide means which will hold the lever 76 positively in either of its extreme positions, i. e. S1 or S4. Such means are particularly desirable for holding the mechanism in the S1 or S4 position in cases in which it is desired to de-energize the circuits of the windings after the solenoids have moved the control mechanism to such positions. Such means may be provided in the form of an extensile spring 127, one end of which is fastened to the base B at a point opposite the axis of the disc 73 and the other end to a pin 128 fastened in the disc 73 at one side of a line through the axis of the disc and the fixed end of the spring.

As is shown in Figure 5, the spring 127 functions to pull the disc 73 against the pin 128 and hold the lever 76 in S1 position positively against accidental misplacement. In like manner the spring will hold the lever 76 positively in its S4 position as shown in Figure 8.

The spring 127 also has another function. When the solenoid 124 is energized it moves the lever 76 to the S2 position as mentioned above. Then when the solenoid 124 is deenergized the spring 127 becomes effective to move the lever 76 back to station S1. Also, should the lever 76 be moved either by manual operation or by an auxiliary solenoid (not shown) to station S3 the spring 127 will be effective to move the disc 73 to station S4 when the solenoid is de-energized or when the hand of the operator is removed. Since in most cases it is not desirable to have the lever 76 inadvertently left in any of the intermediate stations for any length of time the spring 127 serves as a safeguard against the carelessness of an operator leaving the control mechanism wherein its parts are not disposed in either of two main work positions, i. e. S1 or S4.

When used with certain kinds of apparatus it is desirable to provide my control mechanism with means which will time the speed of certain control operations so that they may be made in exact timed relation to the operation of other parts associated therewith. One form of such means comprises a double action dash pot device which includes the cylinder 130 having two pistons 131 connected by a bar 132 to which is fastened the member 126, the latter extending into the cylinder through a lengthwise slot 133 as shown in Figure 5. Each end of the cylinder 130 may be provided with well-known types of adjustable air valves 134 and movement of the pistons 131 by the energization of any of the solenoids will be resisted in a well-known way by the air that is forced through one of the valves 134. It will be noted that the slot 133 is so arranged that the timing device described above will not begin to function during the initial part of the movement of the rack bar 117 in either direction because of the energization of a solenoid. This construction is very desirable since it permits a quick initial movement of the control mechanism and certain connected parts of the associated apparatus, and then causes the final movement of such parts and other parts subsequently connected to the control mechanism to be made in a more gradual manner. It can be readily seen that the positioning of the cylinder 130 and slot 133 can be varied to suit special operating conditions of the machine controlled by the herein described control mechanism of which the slot forms an element.

My control mechanism is thus well suited for controlling devices which effect the operation of electric switches which it is very desirable to open and close quickly. Also, this characteristic is useful in connection with the operation of many types of clutches which should be operated quickly while other related operations can best be initiated or carried out gradually.

While the film f is being fed through the apparatus of Figures 3 and 4 the control mechanism of my invention is disposed as shown in Figure 5. When all of the film supported on the spindle 2 has been projected, the control lever 76 may then be moved to the Figure 8 position either by hand or by film actuation of the solenoid 114 in a way to be presently described. Upon the movement of the lever 76 to the Figure 8 position, the vertical rock shafts 87 and 88 and the coaxial sleeve 90 are each rotated angularly a considerable extent clockwise and counterclockwise respectively (as viewed in Figure 8). To the upper end of the shaft 87 is fastened a film protecting heat shield 87' which may be constructed as described in my parent application, now Patent Number 1,943,303 and which will be moved from an ineffective position with the control mechanism disposed as in Figure 5 to an effective position as when the control mechanism is disposed as in Figure 6, 7, or 8. When in effective position, the shield 87' arrests enough of the heat of the lamp L to protect the work piece, i. e., the film f, from the heat of the lamp during predetermined work conditions of the machine, as, for example, when the film is stationary. To the upper end of the shaft 88 is fastened a suitable yoke device 140 of well known construction having pins 141 operating in a usual groove in a clutch collar 142 joined to the clutch 21 for operating the same. To the sleeve 90 at a point below its upper end is fastened a suitable yoke device 143 having pins disposed in a usual groove in a collar of the clutch device 8. A second yoke device 144 is fastened to the sleeve 90 at its upper end and has pins 145 engaging in a usual groove in a clutch device 146 which is arranged for releasably connecting the pulley 38 to the shutter shaft 33.

It can be seen from the foregoing description and inspection of Figures 3 and 4 that upon movement of the control lever 76 to the Figure 8 position the take-up spindle 3 and the shutter 31 are first disconnected from the source of power, i. e., the motor M and thereafter the re-winding spindle 2 is connected to the source of power to be revolved in the opposite direction from the take-up spindle 3 as long as the control lever 76 remains in the Figure 8 position. Also, the film guides 50 and 55 which are moved by rotation of the shaft 58 to rewinding positions wherein they provide a shorter and straighter film path remain in such rewinding positions while the lever 76 is at station S4.

It can be seen that the disconnecting operations and the connecting operations described above in the foregoing paragraph can be performed in timed relation to each other because of the time control by the dash pot 130 of the control mechanism of Figure 5.

In Figure 9, there is illustrated means for actuating the control mechanism of the Figures 5, 6, 7, and 8 by the work piece being operated on in the machine. The work piece as shown in Figures 9, 10, and 12 is a film f which may have portions f' adjacent each end and at other desired points constructed of metal for the purposes set forth in my parent application. As shown in Figure 9, this film passes over the metallic guides 50 and 55, which guides are electrically connected, i. e. grounded, through the resilient arm 51 to the frame work of the machine. Riding on each of the guide members 50 and 55 is shown metallic rollers 150 and 155 respectively which are mounted on the ends of metallic arms 156 and 157 respectively. The arms 156 and 157 are insulated from the frame F in any suitable manner and are connected in series with the solenoid coils 113 and 114.

The operation of the structure of Figure 9 for reversing the movement of the film through the machine for rewinding the film is as follows. After nearly all of the film has been fed through the machine and wound upon the take-up spindle 3 one of the metallic portions f' will pass between the roller 155 and the guide 55 and thereby complete the circuit of the solenoid 114. The operation of the solenoid 114 as can be seen from the description hereinbefore will cause the take-up spindle 3 to be disconnected from the source of power and cause the rewinding spindle 2 to be connected to the source of power.

When the rewinding of the film f on the spindle 2 has been completed, a metallic portion f' of the film will pass between the roller 150 and the associated guide member 50 and thereby complete the circuit of the solenoid 113 which will then become effective to operate the control mechanism to connect the apparatus to the motor M for again feeding the film through the apparatus for projection purposes.

In Figure 10, it is illustrated diagrammatically how the control mechanism of the present invention may be actuated by side edge portions of a work piece passing through a machine which is controlled by such control mechanism. Small pieces 160 of thin metal may be clipped or otherwise fastened to a side edge of the film f and pairs of contacts 161 may be arranged for engaging the clips 160. The contact members 161 may be arranged in circuit with the solenoid coils 113 and 114 and the coaction of the clips 160 and the contacts 161 for closing the circuits of the solenoid coils 113 and 114 will be evident to those skilled in the art by inspection of Figure 10. It will be understood that the clips 160 for controlling the rewinding of the entire film should be placed adjacent the trailing end of the film. As will appear hereinafter the clips 160 or the metallic portions of the film f' may be positioned other than adjacent the ends of the film.

It has been described hereinbefore in connection with Figures 9 and 10 how the control mechanism of Figure 5 may be operated by the actuation of the solenoid 113 or 114 by devices carried by the work piece. It can be readily seen by those skilled in electric circuits and electro-magnetic devices that the solenoid coil 124 can be actuated by the means illustrated in Figures 9 and 10. For example, in Figure 9 the solenoid coil 113 may be replaced by the solenoid coil 124 and the control mechanism shown in Figure 5 can be predeterminedly operated by actuating first the coil 114 and thereafter the coil 124. Moreover, a short coil similar to coil 124 may be connected in place of the coil 114 and used in conjunction with the coil 113. It can be readily seen that the coils 113, 114, and 124 may be controlled by the film automatically and certain other operations of the control mechanism of Figure 5 may be manually performed without interference with the control of this mechanism through the solenoids 113, 114, and 124 when actuated by the film.

During the operation of many motor driven machines it is desirable at times to stop the movement of a part of the apparatus or machine in a predetermined relation to some other part not mechanically connected to it or to a certain portion of the work piece. For example, in the apparatus disclosed in Figures 3 and 4 it is essential in showing still pictures that an opening between two of the blades 32 shall be stopped in alignment with the optical axis of the motion picture apparatus for reasons well understood by those skilled in the motion picture art. To secure this result in the structure of Figures 3 and 4, there is attached to one or more of the blades 32 of the shutter 31 a small piece 170 of magnetic metal (see Figure 11) and two electro-magnets 171 may be positioned adjacent the work paths of the parts 170 so as to attract these parts as they pass while these electro-magnets are energized. The positions of the electro-magnets 171 are such that when their armatures, i. e., the parts 170, come to a stop opposite the cores of the electro-magnets 171 an opening between two of the blades 32 will be in alignment with the optical axis of the apparatus. The electro-magnets 171 may be energized manually by a switch 172 of usual design shown in open position in Figure 11. The electro-magnets 171 may also be energized under control of the film as will presently appear at the same time the solenoid 124 is operated for bringing the apparatus to a stop for showing still pictures.

The concomitant operation of the solenoids 171 and 124 can be understood from an inspection of Figures 11 and 12 wherein means are shown for closing the circuits of these electro-magnets by the film. A notch 173 may be provided in the film f at such points therealong where, for example, it is desired to stop the feeding of the film for showing still pictures from the film. The edge of the film f in which the notches are made normally cooperates with a finger 174 urged toward the film by a spring 175. When the film occupies such a position that a notch 173 comes opposite the finger, the finger is moved lengthwise and a metallic contact plate 174p fastened on the finger engages a contact 176 connected to one side of a source of electric current b'. The finger 174 has a connection 174' with one terminal of a time relay 177 the opposite terminal of which is connected with the opposite side of the source of electricity b'. As will be understood by those skilled in time relay devices, the relay device 177 which is shown diagrammatically in the same way as it is shown in my parent case, now Patent 1,943,303, may be constructed in a well known way to operate so as to attract its armature 177' at once, and to release its armature only after a considerable and predetermined period of time regardless of whether the circuit of the relay 177 is maintained open or closed by the film operated switch means. Thus the movement of the finger 174 by the spring 175 into one of the notches 173 energizes the time relay 177 which attracts its armature piece 177'. This piece is arranged as a switch element in a circuit of the solenoid 124 which is thus energized concomitantly with the movement of the finger 174 into each notch 173.

The dimensioning of the core 125 with respect to the center of the magnetic field of the solenoid 124 is such that the solenoid 124 is only effective for revolving the disc 73 an amount sufficient to bring the control lever 76 to station S2 which is the station for still projection. The parts will remain in this position until the time relay, operating in a way well understood in the art, breaks the circuit of the solenoid 124. At such time, the spring 127 will be effective for automatically restoring the parts to normal projecting position at station S1 and the notch 173 then opposite the finger 174 will be moved ahead. The circuit of the time relay 177 is thereafter maintained in open condition until another notch 173 is moved opposite the finger 174. The time relay may obviously be actuated by other means than that shown, for example, for controlling the solenoids 113 and 114. In other words, the periods that the solenoids 113 and 114 remain energized when actuated by the film may be determined by a time relay similar to the relay 177.

As can be seen from inspection of Figure 12, the electro-magnets 171 which stop the shutter predeterminedly are connected in parallel with the solenoid 124 and are thus energized each time the solenoid 124 is energized. Therefore, each time the apparatus is disposed for showing still pictures the shutter 31 is automatically stopped in proper position relative to the optical axis of the apparatus.

Since the shutter 31 is always connected to the intermittent sprocket 56, this sprocket is necessarily stopped when the shutter is brought to a stop by the electro-magnets 171. Also, the film f engaged by the sprocket 56 may be stopped to have a portion, i. e., a frame, disposed in predetermined relation to the blades 32 of the shutter.

When a stopping force is applied to a machine part such as the shutter 31, it is a feature of my invention to provide means for first disconnecting this part from other heavier moving parts of the machine so that it will not be required to apply force necessary to overcome the momentum of these heavier parts. This method and means also often relieve the part to which a stopping force is applied of much strain which is especially desirable when this part and others necessarily connected thereto are relatively delicate and easily put out of order, such as is the case in the matter of the shutter 31 and the sprocket 56. This method and means for stopping a moving part connected with a delicate work piece often serves to prevent very objectionable strains from being transmitted to the work piece. Such disconnecting means as noted above in this paragraph reside in the clutch device 146 and the parts described hereinbefore for operatively connecting this clutch device with the solenoid 124. It can be seen from inspection of Figures 1 and 6 that the application of a retarding force to the motor M takes place before the clutch 146 is operated which method of operating these means associated with the stopping of the shutter is desirable since the shutter will have been slowed down some while still connected with the motor. This makes it easier for the electro-magnets 171 to perform their function of completely stopping the revolving shutter in a predetermined relation to the optical axis.

While the apparatus disclosed hereinbefore is designed for operating on a work piece in a certain way as is particularly described in my parent application, it will be understood as the description proceeds that the control means of the present invention are not limited to use with machines operating on their work pieces in the way described herein. Also, it will be understood that while the present invention is disclosed in connection with a machine operating on a tangible work piece, it can be applied to machines such as electric generating devices, air moving apparatus, and the like which operate without apparently affecting a visible work piece or work product.

In the foregoing portion of the description it has been disclosed how my control mechanism can bring about changes in the work conditions of certain parts of the apparatus shown in the accompanying drawings. By reference to my parent application it can be seen how my control mechanism may control the work condition of a plurality of other parts of the apparatus, such as for example, shielding means (not shown) for preventing the film from catching on the teeth of the intermittent sprocket 56 while the film is being rewound. It can be readily seen by those skilled in control mechanisms that the adaptability of the control mechanism of the present invention makes it suitable for use with machines much more complex than the one illustrated in my parent application. For example, such a machine and a control mechanism therefor which embodies certain features of the present invention is shown in application Serial Number 352,525, patented March 12, 1935, No. 1,993,735, owned by the assignees of the present application.

In Figures 1 and 2, means are illustrated for accomplishing that purpose of my invention which relates to changing automatically the speed of the motor or other source of power driving the apparatus upon the operation of the control mechanism for changing the work conditions of operable parts of the apparatus. To this end, a plurality of electric switch operating members or trips 180 and 181 may be mounted on the bar member 117 for adjustment therealong by any well known suitable means such as for example, by screws 182. It can be seen as the description proceeds that more than two fingers 180, 181 may be mounted on the rack bar 117 if desired and that some of such fingers may extend downwardly from the bar 117 as well as upwardly. For cooperation with the fingers 180, 181 respectively there are shown switch devices 183 and 184 mounted on pivots 185 to be swung outwardly, i. e., away from each other. A stationary stop member 186 is mounted in any suitable way for preventing the inward movements of either of the pivoted switch devices 183 and 184, and springs 187 normally urge the devices 183, 184, each against its associated stop member 186.

Lower or dependent members 188 and 189 of the switch devices 183 and 184, respectively are hingedly fastened at the lower ends thereof on pivots 190 to be swung inwardly by means presently to appear after the main portions of the switch devices 183 and 184 are stopped against the stop members 186. Lower end elements 191 and 192 of the switch members 188 and 189, respectively, are preferably constructed of electrical non-conducting material and are sloped upwardly and outwardly as indicated in Figure 1. The remaining upper portions of the switch members 188 and 189 may be made of electrical conducting material.

The normal circuit of the motor M extends from a source of electricity E through a conductor 194 to a contact terminal 195 thence through the switch device 184 and a conductor 196 to the motor M, thence through a conductor 197 to the switch device 183 thence through a contact terminal 198 and a conductor 199 back to the source of electricity E. The normal work position of the switch portion 189 is as indicated in dotted lines in Figure 1 wherein it is in contact with the terminal 195. While the apparatus illustrated in Figures 3 and 4 is operating to rewind the film, the trip member 181 is positioned to the left of its solid line position in the position indicated in dotted lines in Figure 1 and the switch member 184 is in contact with the terminal 195. In like manner, while pictures are being projected, the trip member 180 is positioned at the right of the switch member 190.

For moving the trip member of 181 to the rewinding or dotted line position and concomitantly controlling the motor M the operation is as follows. The solenoid 114 is energized by means disclosed hereinbefore and the bar 117 is moved leftwardly. During the initial portion of the leftward movement of the bar 117 the trip finger 181 engages the switch member 189 and breaks the connection between the terminal 195 and the switch member 189. When this occurs, the electrical circuit of the motor passes from the conductor 194 through a resistance element 200 to the switch member 189, thence to the motor and back to the source of electricity E over the same portion of the motor circuit as described hereinabove. The increased resistance in the circuit of the motor by the resistance element 200 will slow down the motor in a way well understood by those skilled in the construction and operation of electric motors.

Immediately after the resistance 200 is placed in the circuit of the motor M and the latter slowed down the control mechanism operated by movement of the bar 117 as described hereinbefore begins to function. During the initial movement of the bar 117, the dash pot 130 has no appreciable retarding effect upon the speed of movement of the bar 117 being moved by the solenoid 114. While the control mechanism is functioning, the dash pot operates to slow down the speed of the bar 117 and thereby advantageously controls the time that the resistance element 200 is kept in the circuit of the motor. After a predetermined movement of the trip member 181 it is released from the switch member 189 and the spring 187 associated with the switch device 184 instantly returns the switch member 189 into contact with the terminal 195 and the resistance 200 is short-circuited, which leaves the circuit of the motor in normal operating condition.

After the film has been rewound subsequent to the operation of the solenoid 114, the solenoid 113 will be energized by means described hereinbefore which are carried by the film and the trip 181 will be moved rightwardly until its upper beveled portion engages against the lower beveled portion of the switch member 189 and the latter is thereupon swung inwardly about the pivot 190 to permit the trip member 181 to pass entirely under and clear of the switch member 189. The contact terminal 195 is resiliently mounted in a well known way to yield as the switch member 189 is moved rightwardly so that the circuit of the motor is not broken between the switch member 189 and the terminal 195 while the trip member 181 is being moved to the right of the switch member 189. Also the resistance 200 will be arranged to be slightly extended while the switch member 189 is being swung to the right by the trip member 181. The operation of the trip member 180 and the switch member 188 and the functioning of the resistance element 201 can be understood from the above description of like parts associated with the switch device 184.

Since the finger piece 71 is connected with the rack bar 117, manual movement of the finger piece for controlling desired parts of the film handling apparatus becomes automatically effective by the means described above for slowing down the motor regardless of the speed of operation of the finger piece.

It can be readily seen by those skilled in electric circuits and especially in connection with the operation of electric motors that the resistances 200 and 201 may be cut into the motor circuit by well known means in a gradual predetermined manner in such cases as is desirable for such operation of the resistances. Likewise, each resistance instead of being taken out of the circuit all at the same instant, when desired, may be cut out gradually by well known rheostat means. In such case, the initial leftward movement, as viewed in Figure 1, of the switch device 184 will be effective to cut into the circuit of the motor M a resistance much less than that of the resistance 200; the next portion of the leftward movement of the switch device 184 will cut in a larger amount of resistance than such first named resistance; and so on with increasing amounts of resistance being cut into the circuit of the motor until such amounts are gradually made equal to the resistance 200. For cutting resistance gradually into and out of the circuit of the motor M, portions of the switch device 184 and the resistance 200 may be constructed in any suitable well known way, for example, such as is shown in Figure 24 of the joint application of Earle L. Parmellee, deceased, and myself, Serial Number 105,159, filed April 28, 1926, which application matured as Patent Number 1,944,024 on January 16, 1934.

It can be seen from the above description of the operation of the control mechanism in connection with the circuits of the motor M as shown in Figure 1 that a small initial movement of any of the solenoids 113, 114, or 124 is effective for first placing an additional resistance in the circuit of the motor M; thereafter keeping that resistance in the motor circuit for a predetermined period of time, which period can be varied to suit the particular operational requirements of the machine controlled. Then this resistance can be removed to permit the electric motor to resume full speed operation, after the concomitant control operations have been performed.

It can be seen from consideration of the varied control operations possible with the control mechanism illustrated in the present invention that the interconnections provided in the present invention between this control mechanism and the motor which drives the machine or apparatus to be controlled is effective for reducing the speed of the motor M concomitantly with the change of the work condition of numerous machine parts as well as the work piece in the machine. This is done whether the operation of the control mechanism is effected by hand or by energizing one of the solenoids drivingly connected to the control mechanism. Such reductions of speed as can be readily seen by those skilled in the operation of high speed machinery is effective to prevent or relieve many sudden shocks and strains which otherwise would have to be absorbed and resisted by the machine or apparatus during a single day's operation thereof.

It can be further seen by those skilled in the construction and operation of electric motors that the means and method provided for slowing down the motor a predetermined amount for a predetermined period does not strain the motor each time the work condition of a part of the driven machine is changed, as would be done should the motor be completely stopped and thereafter quickly started up again while connected to the machine with a full load thereon, both the machine and the motor having to be started from a full stop.

In Figure 2 there is illustrated an embodiment of my invention in which a brake which is operated concomitantly with the operation of the solenoids 113 and 114 may be applied to a brake drum D fastened on the shaft 25 of the motor M or any other source of power which may be used to replace the motor M for driving the apparatus to be controlled. In the following portion of the specification and in the broader subjoined claims, the term "braking force" is used to apply generically to speed reducing mechanism as to the above described brake engaging a moving part or to the modification of the power reaching the motor as through the introduction of resistance into its circuit. According to this embodiment of my invention two brake operating solenoids 210 and 211 are provided and have the cores connected by a bar member 213. Strongly and rigidly mounted on the bar 213 is a transversely disposed arm member 214 which has its upper end pivotally connected to the lower end of a pivoted member 215 which carries a brake shoe 216 disposed in close proximity to the drum D. A pivoted member 217 similar to the member 215 carries a brake shoe 218 disposed on the opposite side of the drum D from the brake shoe 216. The lower end of the brake shoe carrying member 217 is connected by a link member 220 to the upper end of the rigidly mounted member 214. Springs 221 and 222 are fastened to the members 215 and 217 respectively normally to urge them away from the brake shoe D.

For operating the solenoid 210 there is provided a circuit which includes a conductor 224 connecting the solenoid 210 with the solenoid 113. The coil of the solenoid 113 is connected with a contact terminal 225 disposed at the right of the solenoid 113 as viewed in Figure 2. The circuit of the solenoid 210 further includes a conductor 226 leading to one side of a source of electricity 227. From the other side of the electric source 227 a conductor 228 extends to a connection with an armature piece 230 which may be pivotally mounted at 231.

The solenoid 211 has a circuit similar to the circuit described for the solenoid 210 which includes a conductor 232 connecting the solenoid 211 with the solenoid 114. The coil of the solenoid 114 is connected to a contact terminal 233 disposed adjacent the contact terminal 225 and on the opposite side of the armature 230 therefrom. The solenoid 211 also has a connection with the source of electricity 227 extending through a conductor 234.

The armature piece 230 is disposed in normal position between the contacts 225 and 233 out of engagement with each contact, and may be arranged in a well known way to be attracted against the contact terminal 225 when the solenoid 113 is energized. This operation will close the circuit of the solenoid 210 which upon being energized moves the connecting member 213 to the left as viewed in Figure 2 and brings the brake shoe 216 operatively against the drum D and thereby slows down the source of power to which the drum D is connected. When the solenoid 113 is de-energized the armature piece may be swung away from the contact 225 by gravity or by a well known arrangement of opposed springs to its Figure 2 or open position.

The solenoid 114 when energized will attract the armature piece 230 against the contact terminal 233 and close the circuit to the solenoid 211. This will cause the connecting bar 213 to be moved to the right as viewed in Figure 2 and thereby pull the brake shoe 218 against the drum D and slow down the source of power.

It will be understood by inspection of Figures 2 and 9 and 10 that the solenoids 113 and 114 are each energized by current from the battery of Figure 9 or 10 upon the operation of switch means controlled by the film. It will also be understood by those skilled in electric mechanisms that the solenoids 113 and 114 and the battery 227 will ordinarily be constructed so that neither of these solenoids will be affected by the current from the battery 227 to a degree sufficient so as to hold the armature 230 after the film controlled circuits of these solenoids are broken. It will be noted that the armature 230 may be positioned a considerable distance from the adjacent ends of the coils of the solenoids 113 and 114. Since the solenoids 210 and 211 are directly connected with no source of current except the battery 227, it is obvious that they should be designed for operation by current from the battery 227. It will be readily understood by those skilled in electric mechanisms that the parts and circuits of the Figure 2 structure are shown by a simple wiring diagram merely for illustrative purposes. It can be further seen by those skilled in electric circuits that the coils of the solenoids 113 and 114, in practice, obviously need not form elements of the circuits of the solenoids 210 and 211, respectively.

In addition to the advantages of my invention mentioned hereinbefore, other advantages arise from the organization of a control mechanism operated by a plurality of solenoids of different operative pulls with a means for applying a retarding force to a source of power so that the retarding force is applied irrespective of which solenoid is energized.

Other advantages arise from the provision of a control mechanism operable either manually or by electrical devices arranged for cooperation with means for applying a braking or retarding force to a source of power so that the force is applied when the control mechanism is operated either manually or electrically.

Other advantages arise from the provision of methods for operating a control mechanism for a machine in desired timed relation to the concomitant operation of a means for applying a retarding force for a definite period to said machine.

Other advantages of this invention will be evident from the foregoing portion of this specification, the drawings and the subjoined claims.

I claim:

1. In combination with a machine, a motor, an operable connection between said motor and said machine, control mechanism operative independently of said motor and actuable by said machine, means operable by said control mechanism for rendering said connection inoperative and thereby stopping said machine, and means actuated by said control mechanism for slowing down said motor preparatory to rendering said connection inoperative.

2. In combination, a machine operating on a work piece, said machine having a movable member, a source of power, means for applying power from said source to said machine for driving said machine to operate on said work piece and concomitantly move said member, means operable for stopping said member in predetermined relation to said work piece, means operable for applying braking force to said source of power, and means connected with said stopping means and said braking means for concomitantly operating said braking and stopping means.

3. In combination, a machine including means operable for moving a work piece along a work path through said machine, first in one direction and thereafter in an opposite direction, a source of power, clutch devices for applying power from said source to said moving means for operating the same for moving the work piece in said first direction, clutch devices for applying said power to said moving means for operating the same for moving the work piece in said opposite direction, means for applying braking force to said source of power, and means connected to said braking means and to each of said power applying devices for operating said braking means concomitantly upon the operation of either of said power applying devices.

4. The structure of claim 3 including means effective to cause the breaking force to be applied prior to the operation of either of said power applying devices.

5. In combination, a machine, a source of power for driving said machine, means operable for connecting and disconnecting said machine from said source of power, means operable for applying braking force to said source of power, operable control means connected to said braking means and to said connecting and disconnecting means for necessarily operating said braking means a short time prior to the operation of said connecting and disconnecting means either for connecting or disconnecting said machine and said source of power, and a source of power other than said first named source of power for operating said control means.

6. In combination, a machine, a source of power for driving said machine, means operable for connecting and disconnecting said machine from said source of power, means operable for applying brake force to said source of power, operable control means connected to said braking means and to said connecting and disconnecting means for necessarily operating said braking means a short time prior to the operation of said connecting and disconnecting means either for connecting or disconnecting said machine and said source of power, and a source of power comprising a solenoid device having two oppositely acting solenoids connected to said control means for operating the same.

7. In a control mechanism for a machine driven by a motor including an electrical circuit, in combination, a first solenoid, a second solenoid acting oppositely to said first solenoid, a member connecting the cores of said solenoids, instrumentalities movable for controlling said machine, devices operatively connecting said controlling instrumentalities and said core-connecting member, and means operated by operative movement of said core-connecting member for controlling the circuit of the motor of said machine, said controlling means including devices for placing additional resistance in the circuit of said motor before said instrumentalities are operatively moved.

8. In combination, a machine for operating on a work piece and having a plurality of separately operable control parts, actuable control means, a connection between said control means and each of said operable parts for separately actuating a desired one of said parts by said control means, a source of power, devices operatively connecting said source of power and said machine, actuable means for applying braking force to said source of power, and a connection between said braking means and said control means for actuating said braking means in predetermined relation to the actuation of said part by said control means.

9. The combination with a machine and a motor for driving said machine, of a control mechanism for connecting and disconnecting said machine to and from said motor, means independent of said motor for operating said control mechanism, means operated concomitantly with said control mechanism for slowing down said motor preparatory to its connection and disconnection respectively to and from said machine, and means for slowing down said means operating said control mechanism during the connection or disconnection of said motor to and from said machine.

10. In combination, a machine having an operable part movable along a work path, means operable for stopping said part at a predetermined point in its work path, a source of power for driving said machine and operating said part, actuable control means connected to said machine and to said source of power, said control means including devices for applying a braking force to said source of power and thereafter operating said stopping means concomitantly, and a single means for actuating said control means and said stopping means.

11. The combination with a machine having a part movable along a work path, and a source of power connected to said machine for operating the same to move said part along its work path, of control means connected to said movable part and to said source of power, said control means including devices for stopping said movable part for a predetermined period of time at a predetermined point along its work path, and devices for slowing down said source of power preparatory to the stopping of said operable part.

12. The combination with a machine comprising a plurality of operable parts and an electric motor for driving said machine, of a control mechanism having instrumentalities connected with certain of said machine parts the operation of which it is desired to control, means for operatively moving said instrumentalities to control said machine parts, two oppositely acting solenoids for driving said moving means, electric means operated upon initial movement of said moving means by said solenoids in either direction for slowing down said motor during the operative movement of said moving means, and means connected to said moving means for slowing down the same while said moving means moves said instrumentalities subsequently to the initial movement of said moving means by said solenoids.

13. In control mechanism for a motor driven machine, in combination, a first solenoid, a second solenoid acting oppositely to said first solenoid, a member connecting the cores of said solenoids, instrumentalities movable for controlling said machine, devices connecting said controlling instrumentalites and said core-connecting member, means operated by initial movement of said core-connecting member for controlling the circuit of the motor of said machine prior to the movement of said instrumentalities, and means connected to said core-connecting member for slowing down the operative movement thereof while it operates said machine controlling instrumentalities subsequently to said initial movement.

14. In control mechanism for a machine driven by a motor, a first solenoid, a second oppositely acting solenoid, devices connecting the cores of said first solenoid and said second solenoid, instrumentalities connected to said devices for operation upon the energization of said first solenoid for controlling said machine, means for maintaining the speed of said motor below normal while the controlling instrumentalities operated by said first solenoid are effective on said machine, and means operated by said first solenoid for slowing down the movement of said controlling instrumentalities.

15. The method of controlling a machine driven by a continuously operating driving means comprising initially applying a retarding means to said driving means so as to slow down said machine, prolonging the application of said retarding means, initiating the change of a work condition of said machine a predetermined period after the beginning of the application of said retarding means, and stopping the application of said retarding means after the changing of said work condition has been completed.

16. The method of controlling a stationary power driven machine and stopping an operatively moving part thereof releasably connected with heavier moving parts of said machine, said method comprising initially applying a retarding means to the power which drives said machine, prolonging the application of said retarding means, releasing the connection of said first named moving part with said heavier moving parts after the speed of all of said parts has been initially decreased, and applying a stopping force to said first named moving part after its connection with said heavier moving parts has been released so that the momentum of said heavier moving parts does not have to be overcome when stopping said moving part.

17. In control mechanism for a machine driven by a motor including an electrical circuit, in combination, a first solenoid, a second solenoid acting oppositely to said first solenoid, instrumentalities connecting the cores of said solenoids, instrumentalities movable for controlling said machine, devices connecting said controlling instrumentalities and said core-connecting instrumentalities, and means operated by initial movement of said core-connecting instrumentalities for controlling the circuit of the motor of said machine before said controlling instrumentalities become operative.

18. In combination with a machine, an electric motor, an operable connection between said motor and said machine, control mechanism operative independently of said motor and actuable by said machine, means operable by said control mechanism for rendering said connection inoperative and thereby stopping said machine, means actuated by said control mechanism for slowing down said motor preparatory to rendering said connection inoperative, means including an actuating electrical circuit for operating said control mechanism, and a circuit for said last previously mentioned means separate from the circuit of said electric motor.

19. In control mechanism for a machine driven by an electric motor, in combination, a first solenoid, a second solenoid acting oppositely to said first solenoid, a member connecting the cores of said solenoids, instrumentalities movable for controlling said machine, devices operatively connecting said controlling instrumentalities and said core-connecting member, means operated by operative movement of said core-connecting member for controlling the circuit of the motor of said machine, said controlling means including devices for placing additional resistance in the circuit of said motor before said instrumentalities are operatively moved, and means for making said resistance-placing devices effective when the core-connecting member is moved in either direction.

20. In combination, a machine having a plurality of operable parts, one of said parts being movable along a work path, a source of power for driving said parts, means operable for stopping said part at a predetermined point in its work path, control means for applying a braking force to said source of power, said control means including devices operable for stopping said movable part after the application of said braking force and for maintaining the remaining operable parts of said machine connected to said source of power.

21. In combination, a machine having means for operatively moving a fragile work piece through said machine, driving means for said moving means, means actuable by said work piece operable for stopping said moving means for a predetermined time, a brake operable for reducing the speed of said driving means, and sequential control mechanism operatively interconnecting said stopping means and said brake for assuring the operation of said brake during a predetermined period prior to the operation of said stopping means.

22. In combination, a machine having means for operatively moving a work piece through said machine, driving means for said moving means, means actuable by said work piece operable for stopping said moving means for a predetermined time, a brake operable for reducing the speed of said driving means, and sequential control mechanism operatively interconnecting said stopping means and said brake for assuring the operation of said brake prior to the operation of said stopping means.

23. In combination, a machine having means for operatively moving a fragile work piece through said machine, driving means for said moving means, means actuable by said work piece operable for stopping said moving means for a predetermined period, a brake operable for reducing the speed of said driving means, means for restarting said moving means after the lapse of said predetermined period, and sequential control mechanism operatively interconnecting said stopping means, said re-starting means and said brake for assuring the operation of said brake during a predetermined period prior to the operation of either said stopping or said re-starting means.

24. In combination, a machine having means for operatively moving a work piece through said machine, driving means for said moving means, means actuable by said work piece operable for stopping said moving means for a predetermined period, a brake operable for reducing the speed of said driving means, means for restarting said moving means after the lapse of said predetermined period, and sequential control mechanism operatively interconnecting said stopping means, said re-starting means and said brake for assuring the operation of said brake prior to the operation of either said stopping or said re-starting means.

25. In combination, a machine having means for operatively moving a work piece, driving means for said moving means, means operable for disconnecting said driving means and said moving means, a brake operable for reducing the speed of said driving means, and control means interconnecting said disconnecting means and said brake, said control means including a first electric mechanism for operating said disconnecting means and a second electric mechanism operatively interconnected therewith for operating said brake concomitantly with the operation of said first electric mechanism, and prior to the operation of said disconnecting means.

26. In combination, a machine having means for operatively moving a work piece, driving means for said moving means, means operable for disconnecting said driving means and said moving means, a brake operable for reducing the speed of said driving means, and sequential control means interconnecting said disconnecting means and said brake, said control means including a first electric mechanism for operating said disconnecting means and a second electric mechanism operatively interconnected therewith for operating said brake concomitantly with the operation of said first electric mechanism, and prior to the operation of said disconnecting means, a third electric mechanism for re-connecting said driving means and said moving means, and a fourth electric mechanism operatively interconnected with said third mechanism for operating said brake prior to the re-connection of said driving means and said moving means.

27. In combination, a machine having actuable means for moving a work piece in one direction, an alternatively actuable means for moving the work piece in the opposite direction, revoluble means for driving both of said moving means, a brake operable for reducing the speed of said driving means, said brake including a brake drum on said revoluble driving means, two brake shoes each shoe being associated with one of said moving means, one shoe engaging said drum on one side thereof and the other shoe engaging said drum on the opposite side of said first named shoe, two oppositely acting solenoids operatively connected to said brake shoe, one of said solenoids being operative for applying one of said shoes to said drum, the other of said solenoids being operative for applying the other of said brake shoes to said drum, control means operable for actuating said solenoids, one at a time, said control means including two oppositely acting control solenoids, and an electrical connection between each of said last named solenoids and the associated brake operating solenoid for operating the same concomitantly upon the operation of the associated control solenoid, means operatively interconnected with both of said moving means and controlled by the work piece for actuating one of said control solenoids for energizing one of said brake shoe operating solenoids a predetermined period prior to the ceasing of operation of the associated moving means, and means for breaking said electrical connection upon deenergizing either of said control solenoids.

28. In combination, a machine having actuable means for moving a work piece in one direction, an alternatively actuable means for moving the work piece in the opposite direction, revoluble means for driving both of said moving means, a brake operable for reducing the speed of said driving means, said brake including a brake drum on said revoluble driving means, two brake shoes each being associated with one of said moving means, one shoe engaging said drum on one side thereof and the other shoe engaging said drum on the opposite side of said first named shoe, two oppositely acting solenoids operatively connected to said brake shoe, one of said solenoids being operative for applying one of said shoes to said drum, the other of said solenoids being operative for applying the other of said brake shoes to said drum, control means operable for actuating said solenoids, one at a time, said control means including two oppositely acting control solenoids, and a separate connection between each of said last named solenoids and the associated brake operating solenoid for operating the same concomitantly upon the operation of the associated control solenoid, and means operatively interconnected with both of said moving means and controlled by the work piece for actuating one of said control solenoids for energizing one of said brake shoe operating solenoids preparatory to the ceasing of the operation of the associated moving means.

29. In combination, a machine having actuable means for moving a work piece in one direction, an alternatively actuable means for moving the work piece in the opposite direction, revoluble means for driving both of said moving means, a brake operable for reducing the speed of said driving means, said brake including a brake drum on said revoluble driving means, two brake shoes, one shoe engaging said drum on one side thereof and the other shoe engaging said drum on the opposite side of said first named shoe, two oppositely acting solenoids, operatively connected to said brake shoe, one of said solenoids being operative for applying one of said shoes to said drum, the other of said solenoids being effective for applying the other of said brake shoes to said drum, control means operable for energizing said solenoids, one at a time, and means controlled by the work piece and having an interconnection with both of said moving means, said last named means being arranged for actuating said control means to energize one of said brake shoe-operating solenoids for applying the brake shoe associated therewith in timed relation to the actuation of the one of said moving means associated with said last named solenoid.

30. In combination, a machine having actuable means for moving a work piece in one direction, an alternatively actuable means for moving the work piece in the opposite direction, revoluble means for driving both of said moving means, a brake operable for reducing the speed of said driving means, said brake including a brake drum on said revoluble driving means, two brake shoes, one shoe being associated with one of said moving means and engaging said drum on one side thereof and the other shoe being associated with one of said moving means and engaging said drum on the opposite side of said first named shoe, two oppositely acting solenoids operatively connected to said brake shoe, one of said solenoids being operative for applying one of said shoes to said drum, the other of said solenoids being effective for applying the other of said brake shoes to said drum, control means operable for energizing said solenoids, one at a time, and means controlled by the work piece and having an interconnection with both of said moving means, said last named means being arranged for actuating said control means for energizing either of said brake shoe-operating solenoids for applying the brake shoe associated with the moving means then operative in timed relation to the actuation of said last named moving means.

31. In combination, a machine for operating on a work piece movable through said machine, said work piece being adversely affected by excessive heat, a source of heat cooperating with said machine so that some of said heat reaches said work piece while it is in motion, a motor for driving said machine for moving said work piece, and control mechanism operable for temporarily applying a braking force to said motor for reducing the speed of said machine and said work piece at predetermined intervals relative to the travel of said work piece, said control means including devices for reducing the amount of heat reaching said work piece while said braking force is applied.

32. In combination, a machine having means for operatively moving a work piece through said machine, said work piece being adversely affected by excessive heat, said machine having a source of heat arranged so that some of said heat reaches said work piece while it is in motion for operative purposes, a motor for driving said machine for moving said work piece, and control means operable for temporarily applying a braking force to said motor for reducing the speed of said machine and said work piece at predetermined intervals relative to the travel of said work piece, said control means including devices for reducing the amount of heat reaching said work piece while said braking force is applied, and devices for removing said braking force and concomitantly increasing the amount of heat reaching said work piece from said source of heat.

33. In combination, a machine for operating on a work piece movable relatively to said machine, said work piece being adversely affected by excessive heat, said machine including a source of heat and means arranged for applying a portion of said heat to said work piece, a motor for driving said machine for operatively moving said work piece, means for stopping the movement of said work piece for a predetermined period of time, means operable for reducing the heat reaching said work piece from said source, control mechanism operable for applying a braking force to said motor for reducing the speed of said machine prior to stopping said work piece, and an interconnection between said control mechanism, said stopping means, and said heat reducing means for assuring a reduction in heat reaching said work piece from said source while said braking force is applied, and while said work piece is stopped.

34. In combination, a machine for operating on a work piece movable relatively to said machine, said work piece being adversely affected by excessive heat, said machine including a source of heat and means arranged for applying a portion of said heat to said work piece, a motor for driving said machine for operatively moving said work piece, means for stopping the movement of said work piece for a predetermined period of time, means operable for reducing the heat reaching said work piece from said source, control mechanism operable for temporarily applying a braking force to said motor for reducing the speed of said machine prior to stopping said work piece, and an interconnection between said control mechanism, said stopping means, and said heat reducing means, said control mechanism including devices which necessarily assure a predetermined reduction in heat reaching said work piece from said source while said work piece is moving at a reduced speed, and is stopped.

35. In combination, a machine having a plurality of operable parts including means for intermittently moving a work piece along a work path, a continuously moving member operatively connected to said moving means for cooperative and timed movement therewith, means for driving said moving means and said continuously operating member, a brake for said driving means, means for disconnecting said moving means and said continuously operating means from the remainder of the operable parts of said machine whereby they are freed from the momentum thereof, means for operating said brake, and sequential control means operatively interconnecting said disconnecting means and said brake operating means for first actuating said brake operating means and for thereafter operating said disconnecting means.

36. In combination, a machine having a plurality of operable parts including means for intermittently moving a work piece along a work path, a continuously moving member operatively connected to said moving means for cooperative and timed movement therewith, means for driving said continuously operating member and said operable parts, a brake for said driving means, means for disconnecting said moving means and said continuously operating means from the remainder of the operable parts of said machine whereby they are freed from the momentum thereof, means for operating said brake, sequential control means operatively interconnecting said disconnecting means and said brake operating means for first actuating said brake operating means and for thereafter operating said disconnecting means, and means for stopping said moving means and said continuously operating means in a predetermined position subsequent to their disconnection from the remaining parts of said machine, the remaining parts of said machine being left in motion.

37. In combination, a machine having means for winding up a strip work piece, means for driving said winding up means, an operating means associated with the work piece for operatively moving the same independently of said winding up means, a connection between said driving means and said moving means for driving the same, a brake for said driving means, means operable for disconnecting said moving means from said driving means while leaving said winding up means connected therewith, control means for operating said disconnecting means and said brake, and means interconnected with said control means for stopping said moving means subsequent to the operation of said brake, said stopping means thereby being effective on said moving means without being required to overcome any momentum transmitted thereto from said winding up means and without being required to overcome the full momentum of said moving means.

38. In combination, a machine having means for winding up a strip work piece, means for driving said winding up means, an operating means associated with the work piece for operatively moving the same independently of said winding up means, a connection between said driving means and said moving means for driving the same, a brake for said driving means, means operable for disconnecting said moving means from said driving means while leaving said winding up means connected therewith, control mechanism for operating said disconnecting means, and said brake, and means interconnected with said control mechanism for stopping said moving means a predetermined time subsequent to the operation of said brake.

39. In a control means for a revoluble driving means having a shaft, in combination, a first control solenoid, a second oppositely acting control solenoid, a brake drum on said shaft, two brake shoes mounted for operatively engaging said drum, and means for operatively applying said brake shoes one at a time to said drum, said last named means including a first brake-applying solenoid connected with said first control solenoid, and a second brake-applying solenoid connected with said second control solenoid, the connections between said control solenoids being such that each of said brake solenoids is actuated simultaneously with the operation of its associated control solenoid to apply one of said brake shoes to said drum.

40. In a control means for a revoluble driving means having a shaft, in combination, a first control solenoid, a second oppositely acting control solenoid, a brake drum on said shaft, two brake shoes mounted for operatively engaging said brake drum, means for operatively applying said brake shoes one at a time to said drum, said last named means including a first brake-applying solenoid interconnected with said first control solenoid, and a second brake-applying solenoid connected with said second control solenoid, the connections between said control solenoids being such that each of said brake solenoids is actuated simultaneously with the operation of its associated control solenoid to apply one of said brake shoes, and means for maintaining each of said brake-applying solenoids operative only as long as its associated control solenoid is energized.

41. In a control means for an electric motor, in combination, a first solenoid having a core, a second oppositely acting solenoid having a core, a member connecting said cores, a trip member on said connecting member associated with said first solenoid, a trip member on said core associated with said second solenoid, means for adjusting said trip members along said connecting member, a circuit for said motor, a first normally closed switch in said circuit, means for opening said first switch by said first trip member when the same is moved by its associated solenoid, a second normally closed switch in said motor circuit, means for opening said second switch by said second trip member when the same is moved by its associated solenoid, and resistance arranged to be cut into said motor circuit for reducing the speed of said motor upon initial operative movement of either of said trip members by its associated solenoid, for opening the associated switch.

42. In a control means of the class described for an electric motor, in combination, a first solenoid having a core, a second oppositely acting solenoid having a core, a member connecting said cores, a trip member on said connecting member associated with said first solenoid, a trip member on said core associated with said second solenoid, means for adjusting said trip members along said connecting member, a circuit for said motor, a first normally closed switch in said circuit, means for opening said first switch by said first trip member when the same is moved by its associated solenoid, a second normally closed switch in said motor circuit, means for opening said second switch by said second trip member when the same is moved by its associated solenoid, speed-reducing resistance arranged to be cut into said motor circuit upon the initial operative movement of either of said trip members by its associated solenoid for opening the associated switch, and means for preventing the opening of the associated switch by either of said trip members upon its return movement in the opposite direction to its movement by its associated solenoid.

43. The combination with a movable member of a machine and a driving means releasably connected to said machine of an armature device secured to said movable member to be moved therewith along the work path thereof, a stationary electro-magnet mounted adjacent the work path of said armature device at a desired point therealong, and control means for disconnecting said machine and said driving means and thereafter energizing said electro-magnet for attracting said armature device and stopping said movable member at a predetermined point along its work path.

44. The combination with a movable member of a machine and driving means for said machine, of means for releasably connecting said movable member to said machine so that said member is driven by said driving means, an armature device secured to said movable member to be moved therewith along the work path thereof, a stationary electro-magnet mounted adjacent the work path of said armature device at a desired point therealong, and control means for releasing the connection of said movable member to said machine while the same is being driven by said driving means, said control means being effective thereafter for energizing said electro-magnet for attracting said armature device and stopping said movable member at a predetermined point along its work path.

45. The combination with a machine and a motor for driving said machine, of a control mechanism releasably connected to said machine for connecting or disconnecting said machine to or from said motor, and means operated concomitantly with said control mechanism to become operative for slowing down said motor prior to its connection or disconnection respectively, to or from said machine.

46. The combination with a machine and a motor for driving said machine of a control mechanism mechanically connected to said machine for connecting said machine to said motor and means operated concomitantly with said control mechanism to become operative for slowing down said motor prior to its connection to said machine.

47. The combination with a machine and motor for driving said machine of a control mechanism mechanically connected to said machine for disconnecting said machine from said motor, and means operated concomitantly with said control mechanism to become operative for slowing down said motor prior to its disconnection from said machine.

48. In a clutch control mechanism, a revoluble clutch driving element, a revoluble clutch driven element, one of said elements being mounted for movement laterally into and out of engagement with the other of said elements, manually operable means for moving said movable element into and out of engagement with said other element, powered means operable at will for moving said movable element into and out of engagement with said other element, said manual means and said powered means being alternatively operable, and means effective for providing an irregular speed of lateral movement of said movable element into engagement with said other element when said movable element is moved by said powered means so that said movable element is moved relatively fast during the initial portion of its lateral travel and relatively slowly during the final portion of its lateral travel.

49. In a clutch control mechanism, a driving clutch element, a driven clutch element, one of said elements being movable laterally into and out of engagement with the other of said elements, manually operable means for operatively moving said movable element into engagement with said other element, powered means for operatively moving said movable element into engagement with said other element, timing mechanism for controlling the lateral speed of movement of said movable element, means rendering said timing mechanism effective when said movable element is moved laterally by either said powered means or by said manual means, and means operable for securing a predetermined prior reduction of speed of said driving clutch element before it is engaged by said driven clutch element.

50. In a clutch control mechanism, a driving clutch element, a driven clutch element, one of said elements being movable laterally into and out of engagement with the other of said elements, manually operable means for operatively moving said movable element into engagement with said other element, powered means for operatively moving said movable element into engagement with said other element, timing mechanism for controlling the lateral speed of movement of said movable element, means operable for securing a predetermined prior reduction of speed of said driving clutch element before it is engaged by said driven clutch element, and means assuring a predetermined increase of speed of said clutch elements after they are engaged one with the other.

51. In a clutch control mechanism, a driving clutch element revolving at a predetermined rate of speed, a driven clutch element, one of said elements being mounted for movement laterally into engagement with the other of said elements, means for moving said movable clutch element laterally, means for securing a predetermined reduction in speed of said driving element before it is engaged by said driven element, and means assuring a return of said driving element to said predetermined rate of speed after it is engaged with said driven element.

52. In a power driven machine, a source of power, a first gear mechanism through which the machine is driven at one speed, a second gear mechanism through which the machine is driven at another speed, clutch means between said source of power and said gear mechanisms, said clutch means including at least one driving element and one driven element, one of said elements being movable into and out of engagement with the other of said elements, control mechanism interlocking both of said gear mechanisms and said clutch means, said control mechanism being operable for rendering one of said gear mechanisms operative and the other inoperative and for operating said clutch concomitantly, and timing means cooperating with said control mechanism effective for determining the interval between the stopping of the operation of one of said gear mechanisms and the starting of the operation of the other of said gear mechanisms, said timing mechanism being further effective for controlling the speed of lateral movement of said movable clutch element so that the initial portion of its movement toward the other of said elements is considerably faster than the final portion of such movement.

53. In a power driven machine, a first gear mechanism through which the machine is driven at one speed, a second gear mechanism through which the machine is driven at another speed, control mechanism interlocking both of said gear mechanisms for rendering one of the said mechanisms operative and the other inoperative, and timing means cooperating with said control mechanism for determining the interval between the stopping of the operation of one of said gear mechanisms and the beginning of the operation of the other of said gear mechanisms.

54. In a clutch control mechanism, a revoluble clutch driving element, a revoluble clutch driven element, one of said elements being mounted for movement laterally into and out of engagement with the other of said elements, means for controlling the speed of rotation of said driving element for decreasing the speed of rotation of said driving element approximately simultaneously with the engagement of said driven element therewith, and means for controlling the lateral speed of movement of said movable clutch element for moving said movable element relatively rapidly during the initial portion of its lateral travel and relatively slowly during the final portion of its lateral travel.

55. In combination with a machine, a motor, an operable connection between said motor and said machine, control mechanism operative independently of said motor and actuable by said machine, means operable by said control mechanism for rendering said connection inoperative and thereby stopping said machine, and means actuated by said control mechanism for slowing down said motor preparatory to rendering said connection inoperative, said last named means including, in combination, a first solenoid, a second solenoid acting oppositely to said first solenoid, a member connecting the cores of said solenoids, instrumentalities movable for controlling said machine, devices operatively connecting said controlling instrumentalities and said core-connecting member, and means operated by the operative movement of said core-connecting member for controlling the speed of the motor of said machine, said controlling means including devices effective for slowing down said motor before said instrumentalities are operatively moved.

56. In combination with a machine for operating on a work piece movable through said machine, said work piece being adversely affected by excessive heat, a motor for driving said machine, an operable connection between said motor and said machine, control mechanism operative independently of said motor and actuable by said machine, means operable by said control mechanism for rendering said connection inoperative and thereby stopping said machine, a source of heat cooperating with said machine so that some of said heat reaches said work piece while it is in motion, means actuated by said control mechanism for slowing down said motor preparatory to rendering said connection inoperative, said last named means including mechanism operable for temporarily applying a braking force to said motor for reducing the speed of said machine and said work piece at predetermined intervals relative to the travel of said work piece, said control mechanism including devices for reducing the amount of heat reaching said work piece while said braking force is applied.

57. In combination with a machine having means for winding up a strip work piece, a motor for operating said machine and driving said winding up means, an operable connection between said motor and said machine, control mechanism operative independently of said motor and actuable by said work piece, means operable by said control mechanism for rendering said connection inoperative and thereby stopping said machine, means actuated by said control mechanism for slowing down said motor preparatory to rendering said connection inoperative, said slowing down means including a brake, an operable means associated with the work piece for operatively moving the same independently of said winding up means, a connection between said motor and said moving means for driving the same, said control mechanism including means operable for disconnecting said moving means from said motor while leaving said winding up means connected therewith, means for operating said disconnecting means and said brake, and means interconnected with said control mechanism for stopping said moving means subsequently to the operation of said brake, said stopping means thereby being effective on said moving means without being required to overcome any momentum transmitted thereto from said winding up means and without being required to overcome the full momentum of said motor.

58. In combination with a machine, a motor, an operable connection between said motor and said machine, control mechanism operative independently of said motor and actuable by said machine, means operable by said control mechanism for rendering said connection inoperative thereby stopping said machine, and means actuated by said control mechanism for slowing down said motor preparatory to rendering said connection inoperative, said slowing down means including, in combination, a first control solenoid having a core, a second oppositely acting control solenoid having a core, a brake drum on the shaft of said motor, two brake shoes mounted for operatively engaging said drum, and means for operatively applying said brake shoes one at a time to said drum, said last mentioned means including a first brake applying solenoid connected with said first control solenoid, and a second brake applying solenoid connected with said second control solenoid, the connections between said control solenoids and said brake solenoids being such that each of said brake solenoids is actuated simultaneously with the operation of its associated control solenoid to apply one of said brake shoes to said drum.

59. In a machine for operating on a strip work piece movable through said machine, said machine including a source of heat, said strip work piece being adversely affected by excessive heat, a motor having a revoluble shaft, means for winding up said strip work piece, means for driving said winding up means, an operating means associated with said strip work piece for operatively moving the same independently of said winding up means, an operable connection between said motor and said driving means for driving the same, an operable connection between said motor and said moving means for operating the same, control mechanism operative independently of said motor and actuable by said strip work piece, means operable for disconnecting said strip moving means from said motor while leaving said winding up means connected therewith, means actuated by said control mechanism for slowing down said motor preparatory to operating said disconnecting means, said slowing down means including, in combination, a first control solenoid, a second oppositely acting control solenoid, a brake drum on the shaft of said motor, two brake shoes mounted for operatively engaging said drum and means for operatively applying said brake shoes one at a time to said drum, said last mentioned means including a first brake applying solenoid connected with said first control solenoid and a second brake applying solenoid connected with said second control solenoid, the connections between said control solenoids and said brake applying solenoids being such that each of said brake solenoids is actuated simultaneously with the operation of its associated control solenoid to apply one of said brakes to said drum, means for stopping the movement of said work piece for a predetermined period of time, means operable for reducing the heat reaching said work piece from said source, and an interconnection between said control mechanism, said stopping means, said brake control solenoids, and said heat reducing means for assuring a reduction in heat reaching said work piece from said source while said braking force is applied and while said work piece is stopped.

WARREN DUNHAM FOSTER.